United States Patent [19]
Perkins et al.

[11] 4,279,205
[45] Jul. 21, 1981

[54] STORAGE

[75] Inventors: Stephen P. Perkins, Beverly; Alex F. Wormser, Marblehead, both of Mass.

[73] Assignee: Wormser Engineering, Inc., Middleton, Mass.

[21] Appl. No.: 78,651

[22] Filed: Sep. 24, 1979

[51] Int. Cl.³ .......................... F23G 5/00; F23G 7/00; F23D 1/00

[52] U.S. Cl. .................................. 110/245; 122/4 D; 110/244; 110/263; 110/295

[58] Field of Search ............... 110/243, 244, 245, 263, 110/265, 347, 295; 266/172; 422/122, 244; 122/4 D

[56] References Cited

U.S. PATENT DOCUMENTS 4,135,885   1/1979   Wormser et al. ................... 422/173

*Primary Examiner*—John J. Camby

[57] ABSTRACT

A fluidized combustor is provided with a burning zone having cooling passages in its upper portion and a lower portion beneath said passages yet deep enough so that material therein may be operated in a fluid bed combustor mode with cooling by fluidizing excess air, a separate zone being provided for selective storage therein of materials transferred from the burning zone.

10 Claims, 1 Drawing Figure

STORAGE

FIELD OF THE INVENTION

This invention relates to burning and desulfurizing fuel, particularly coal, using fluid bed combustors.

BACKGROUND OF THE INVENTION

Some related background is set forth in U.S. Pat. No. 4,135,885, "Burning and Desulfurizing Coal," the contents of which are herein incorporated by reference. Further related background and disclosures are set forth in the application of Alex F. Wormser, "Fluid Bed Combustion," Ser. No. 31,782, filed Apr. 20, 1979 in the United States PTO.*

*Contents hereby incorporated by reference herein.

Efforts to burn coal in fluid bed combustors have met with problems both in turndown (burning at less than maximum capacity) and startup preheat, as a number of those in the art have recognized. One approach to turndown has been to use a multiplicity of combustor units and to totally shut down one or more of them. Another approach has been simply to turn a single combustor off and on fairly frequently. Such approaches have required a good bit of hardware, or been clumsy, or made provisions for very little modulation between full-burning and non-burning conditions, or been characterized by an undesirably low turndown ratio, or made impractical turnoff except at the cost of time-consuming restarts, or several of these. The prior art has also taught away from using excess air for the purpose of bed cooling during turndown.

Heated storage zones have been suggested for use in connection with turndown. One variety of storage bed is disclosed in the above-mentioned U.S. patent. (This patent is not in the prior art.) A storage bed generally similar is disclosed in this latter disclosure, such a storage bed is said not to be satisfactory.

SUMMARY OF THE INVENTION

We have discovered that very effective turndown can be achieved in a fluidized combustor, free from all the abovementioned prior art disadvantages, if two zones in which portions of bed materials may be stored are provided, one portion being a lower part of the actual fluidized bed burning zone, below cooling tubes in the upper part of the burning zone and a separate storage zone to and from which bed material may be transferred from and to the first zone to respectively drop levels of materials below the cooling tubes or elevate the level into the cooling tubes, adequate cooling of the bed being achieved, when its level is below the tubes, by blowing therethrough excess air, the depth below said tubes being such that the first storage zone may be operated as a fluid bed combustor even though the depth is not greater.

Our invention has the additional advantage of greatly improving preheating, a further requirement that has caused difficulty (use of larger and more expensive burners and undesirable production of soot and unburned hydrocarbons), as well as making practical preheating with various energy sources (including gas, liquid, solid, and electrical).

DESCRIPTION OF THE PREFERRED EMBODIMENT

Figure 1:
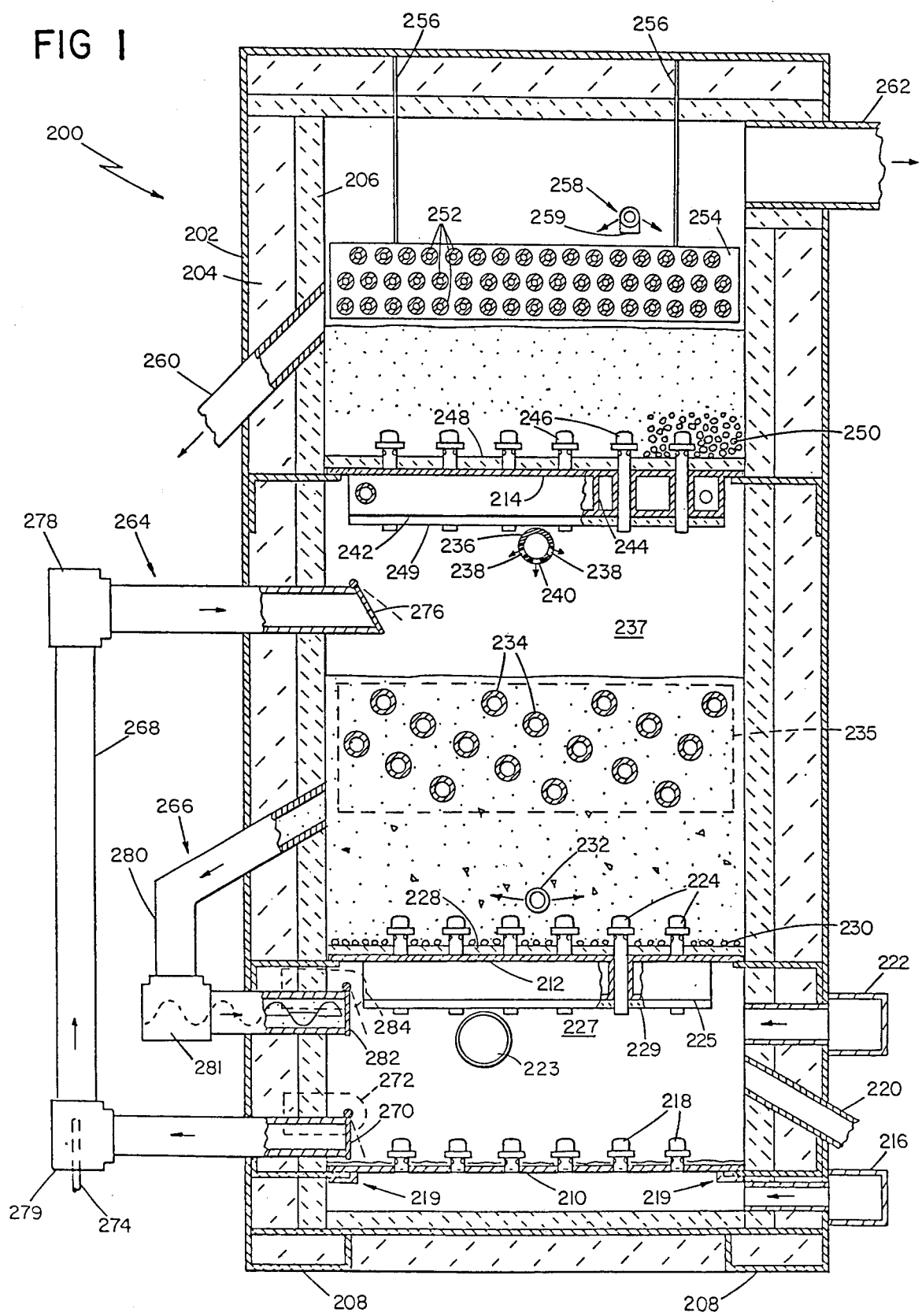
FIG. 1 is a diagrammatic view, mainly in section, of the most preferred embodiment of the invention.

We turn to description of the structure and then operation of the embodiment of FIG. 1.

Structure

There is shown in FIG. 1, diagrammatically, a three-bed, all fluidized, combustor-desulfurizer, indicated generally at 200. A metal housing 202 surrounds layers 204 and 206 of lower and higher density refractory, respectively, to enclose the entire unit, which rests on supports 208. Metal distributor plates 210, 212, and 214 extend across the housing interior to define the bottoms, respectively, of three fluidized beds—a lower bed for storing sand, a middle combustor bed, and an upper desulfurizer bed.

The lower sand storage bed has under it a plenum fed by a windbox 216, through which fluidizing air enters the bed underneath distributor plate 210. A multiplicity of bubble caps 218 extend through plate 210 (over which extends an insulating board, not shown, to avoid hot spots), which is held in place by expandable joints 219. Extending through the housing wall above caps 218 is coarse-ash disposal pipe 220, which carries away to a baghouse hopper excess bed material.

The middle combustor bed has under it plenum 227 for supplying fluidizing combustion air to the middle bed. A multiplicity of bubble caps 224 extend through distributor plate 212 and water jacket 225, which serves to cool plate 212 to prevent it from buckling. A layer of insulation 228 rests on plate 212 surrounding each of caps 224, and a layer of stone 230 (actually coarse quartz in a mix of sizes from $\frac{3}{8}''$ to $1''$ in diameter) covers insulation 228. A similar layer of insulation 229 is secured (by means not shown) to the bottom of water jacket 225. The insulation serves to cut heat loss to the water in jacket 225. Above bubble caps 224 is coal feed pipe 232, which deposits coal at the bottom of the combustor bed, just above bubble caps 224. (Under-the-bed feeding of the coal allows the use of coal fines in the feed which would otherwise, i.e., with over-the-bed feeding, be blown out of the bed without combusting. Over-the-bed feeding would also make it difficult to operate the bed in any but its full-on position, i.e, with sand covering the top of steam tubes 234. At lower sand levels, with over-the-bed feeding, the coal would fall onto the steam tubes, and an agglomeration of unburned coal would soon build up. The inability to operate at reduced sand levels in the middle bed would eliminate use of the preferred turndown and startup methods, as will be described.)

Above pipe 232 and extending across the combustor bed are steam tubes 234, which are mounted at their ends in tube sheets 235 (one shown in broken lines) that define manifolds for introducing water into the tubes and removing water and steam from them. Tubes 234 are spaced and occupy 25% of the housing volume in the zone from the top row of tubes to the bottom row.

The upper desulfurizer bed has under it apertured secondary air pipe 236, which has two rows of holes 238 inclined downwardly at 30° for spreading out the secondary air beneath the upper bed and a third row of holes 240 at the bottom of the pipe for blowing out any particles that may have gotten into the pipe. Above pipe 236 is water jacket 242, which servies to cool distributor plate 214 to prevent it from buckling. Baffles 244 (one shown) serve to keep the velocity of the circulating cooling water high enough to avoid local hot spots that might cause damage. A multiplicity of bubble caps 246 extend through jacket 242 and plate 214. A layer of insulation 248 rests on plate 214 surrounding each of caps 246, and a layer of stones 250 (the same materials as stones 230) covers insulation 248 and caps 246. A similar layer of insulation 249 is secured to the bottom of water jacket 242. The insulation serves the same purposes as that for the middle bed distributor and water jacket. (The purpose of the stones 250 is to allow the gases emerging from bubble caps 246 to spread laterally over the distributor, allowing them to emerge into the upper bed at a sufficiently low velocity to avoid shattering the limestone particles.) Above the upper bed are three rows of tubes 252 to deflect particles back into the bed. Each tube in the middle row is positioned directly above a corresponding tube in the bottom row, but each of the tubes in the top row is positioned halfway between each adjacent pair of vertical pitch lines for the lower two rows. This arrangement avoids the possibility of a line of sight opening at any angle through the tubes so any particle that is ejected from the bed will solidly contact one of the tubes before leaving the bed, thereby reducing its speed and the likelihood of splashing into the freeboard. (A similar bank of tubes may usefully be placed above the second—i.e., combustion—bed.) Tubes 252 are supported near their ends and at spaced positions longitudinally thereof by apertured sheets 254 (only one shown), which are in turn supported from housing 202 by rods 256. Above tubes 252 extends limestone feed pipe 258, which deposits limestone in the desulfurizer bed to a level just above the top row of tubes 252. The limestone drops from the outlet tee 259 of pipe 258 through a gap (not shown) in the assembly of tubes 252; without this gap, some limestone particles may be too large to pass through the tube assembly. Limestone downcomer 260 cooperates with a limestone pot to maintain the level of limestone just above tubes 252 and to carry away spent limestone. Hot desulfurized gases leave through smoke pipe 262, through which they can be transported through a boiler to which they give up their remaining heat, then to a baghouse for removal of any ash or other particulates that may escape from the upper bed, and finally to a stack.

Upcomer assembly 264 and downcomer assembly 266 permit bed material to be moved from the lower bed to the middle bed and vice versa, for preheating and turndown (both to be discussed in more detail subsequently). Upcomer assembly 264 includes upcomer piping 268, which, when door 270 is opened by actuator 272 (shown in broken lines because it is mounted on the exterior of housing 202), permits bed material to be taken from the lower bed and blown by air under pressure from tube 274 into the middle bed through door 276, which is held shut by gravity to prevent filling up of the upcomer piping with bed material when it is not in use but which opens in response to bed material forced up from the lower bed. The normal bed material level for operating the combustor at 100% of capacity is just above the topmost steam tubes, as shown in FIG. 1. Tee fittings 278 and 279 are used when the bed material makes a sharp turn, to reduce wear on the piping there.

Downcomer assembly 266 includes downcomer piping 280, which, when door 282 is opened by actuator 284 (shown in broken lines because it is mounted on the exterior of the housing), permits bed material that has entered the piping from the middle bed to be fed with a feed screw into the lower bed. For normal operation downcomer piping 280 should be filled with bed material to act as a pressure seal so that air from plenum 227 is not able to keep bed material from coming down the piping. Tee fitting 281 is positioned where the bed material makes a sharp turn.

Turning to further particular details of the structure of FIG. 1, we again make reference to U.S. application, Ser. No. 031,782, above-mentioned.

Operation

Sand sized at about 20 mesh (850$\mu$) is supplied to fill the middle bed to a depth of about 11.5". Type 1360 limestone crushed to a mean particle diameter of 20 mesh (850$\mu$) is supplied through feedpipe 258 to fill the upper bed to a depth of about 6".

Start-up of a cold combustor requires preheating as follows. Fluidizing air is supplied from a blower (not shown) through windbox 216, and the middle bed, assuming that it has been previously filled with bed material, is emptied via downcomer assembly 266 until the bed level is below the inlet to the downcomer so that boiler tubes 234 are no longer covered with bed material (remaining material is about 6" deep). Air from windbox 216 passing through bubble caps 218 acts to spread out the bed material deposited by the downcomer, and directed through the storage bed when either the upcomer or downcomer is in operation, to keep the lower bed material uniformly spread out. When the bed level in the middle bed is down to 6 inches, the fluidizing air is turned off. The water circulator pump for pumping water through tubes 234 is turned on. Preheater 223, which is spaced below distributor 212 to provide uniform heating of the middle bed, is then turned on. Flames generated in the preheat burner are cooled to approximately 1700° F. by secondary air before they emerge from the burner, to avoid overheating bubble caps 224. Hot gases emerging from the preheat burner 223 heat the material in the middle bed to about 1000° F. in about an hour, following which coal is added for a minute with fluidization (to assist further preheating), following which preheating is resumed 15 minutes or so, until the bed reaches about 1350° Fahrenheit. Because the boiler tubes are not in contact with material in the middle bed, they do not draw heat from the bed material, and because the bed material is heated when it is not being fluidized (i.e., as a fixed bed), the surface area for heat loss from the bed material is reduced, so that the bed material can be heated with a fairly small preheater.

When the middle bed has reached 1350° F., the propane-fired preheater is turned off. Fluidizing combustion air from the blower is supplied through windbox 222 and through bubble caps 224 to fluidize the middle bed. The fluidizing combustion air is controlled by a valve (not shown) to provide an airflow of 110 scfm per square foot of bed area, which produces a superficial velocity of approximately 7$\frac{1}{2}$ ft/sec. in the upper bed at 1550° F. The coal feed screw and transport air compressor (not shown) feeding air to the coal pot at inlet pipe and to the limestone rotary feeder outlet (not shown) are then started, and coal is fed from a bin (not shown) through a screw feeder, a drier, a crusher, a rotary air lock, and a coal pot (all not shown), and to the middle bed through pipe 232. The coal mixes with the hot bed material and burns. Fluidization causes the coal to be distributed away from the coal feed pipe and become mixed throughout the bed. The heat released from the burning coal heats the bed, until the middle-bed approaches the desired temperature of 1800° F. (A lower setting may be required to avoid clinkering when coals with low-ash-fusion-points are used, and a higher setting may be used with hard-to-burn, unreactive fuels with high-ash-fusion-points). The middle bed is kept from reaching a hotter temperature in part by the cooling effects of the steam tubes 234, which are being splashed by the fluidized bed material, and in part by the effect of the control thermocouple in the middle bed, which serves to control the middle-bed's temperature by adjusting the speed of the screw feeder thereby affecting the fuel/air ratio in the middle bed. Typically the burner will be operating at an excess air of 100% at this condition.

Simultaneously with the coal feed, the limestone feed to the upper bed is started, at a predetermined Ca/S ratio. The limestone, $-\frac{5}{8} +5/16''$ chips, flow from a limestone bin (not shown) through the rotary feeder and are pneumatically conveyed to the upper bed through pipe 258. The rate at which the limestone is fed is determined by the speed of the limestone rotary feeder, whose speed is slaved to the coal screw feeder in order to provide the predetermined Ca/S ratio.

Gases emerging from the middle bed pass through bubble caps 246 and the upper bed, and leave combustor-desulfurizer 200 at pipe 262. As the temperature of the upper bed reaches the upper-bed set point of 1550° F., which is the temperature at which desulfurization efficiency is best, a thermocouple in the upper bed causes a modulating valve (not shown) at the combustion-air blower to open, causing secondary air to flow into the middle-bed freeboard 237 through secondary air pipe 236. The secondary air flow rate is modulated continuously to maintain the upper-bed temperature at 1550° F.

Solids too small to remain in the middle bed, including ash and small particles of carbon, are blown through bubble caps 246 and trapped in the upper bed, where combustion of the small bits of carbon is continued for a few moments, before being blown from the upper bed and out of the burner at duct 262.

Particles too coarse to blow out of the upper bed will cause the upper bed level to rise, causing excess material to be removed at limestone overflow pipe 260.

If, after the bed has reached its desired bed temperature, the system steam pressure is beneath the required amount, the burner automatically arranges to increase its heat output, as follows. Bed material from the lower bed is blown into the middle bed, by operating the upcomer 264. This slowly increases the contact of the bed material with steam tubes 234, thus increasing the heat loss from the bed, causing the middle bed temperature to drop momentarily. The middle-bed temperature sensor causes the coal feed screw to increase the coal feed rate, in order to maintain the bed temperature at its former set point. This process continues, whereby the bed level is increased along with the coal feed rate, until the steam tubes are completely covered. At this point, approximately $\frac{2}{3}$ of the heat of combustion is removed at the steam tubes 234, with the remaining heat removed at the boiler, and the excess air at the middle bed is 5 to 30%. The upcomer must blow fed material slowly enough to avoid quenching of the middle bed, i.e., to allow the coal feed rate to increase fast enough to overcome the cooling effects of the incoming material.

The burner-desulfurizer 200 continues to operate at this, its maximum, capacity, until the steam pressure reaches a set point P2, causing downcomer 266 to be activated and the material in the middle bed to be transferred slowly to the storage bed, thereby reducing the heat transfer to steam tubes 234 and eventually by response of the middle bed thermocouple, the coal feed rate. Reduced heat transfer to steam tubes 234 in turn causes the steam pressure to drop, eventually, below set point P2. At this, downcomer 266 is inactivated. Under most circumstances, the burner is now at equilibrium: the coal feed rate, bed depth, and steam output all remain constant.

Under some circumstances, as for example when there is a large amount of stored steam in the system, so that the steam pressure changes very slowly in response to variations of the firing rate, the downcomer may have been activated too long, causing too much bed material to be transferred to the storage bed, and eventually causing the steam pressure to fall below a lower set point P1, which is less than P2. At this, the upcomer 264 is activated until, eventually, the middle-bed level is such that the steam output matches the steam requirement, and the steam pressure remains between P1 and P2. At this condition, again, no further adjustments to the middle-bed level are required, as long as the steam demand remains constant. If the steam demand changes, however, causing the steam pressure to pass either of the set points, the upcomer or downcomer are activated until the system is again in equilibrium. In this manner, the burner-desulfurizer is continuously modulated from full capacity to about 50% of full capacity. Operation in this manner is called the modulating mode.

If the steam demand drops below the 50% level, a further reduction of the material depth in the middle bed would be incapable of producing further reductions in steam output and, in fact, cannot be achieved insofar as the entrance of downcomer 266 prevents removal of middle-bed material below the six inch depth. In this case, the steam pressure continues to rise, eventually exceeding set point P4 (higher than P2), which causes the burner-desulfurizer 200 to be shut off. Shutoff consists of turning off the coal-feeder, drier, crusher, rotary air lock, and limestone feeder. After 15 seconds, enough time to clear away the solids in coal pipe 232 and limestone pipe 258, the transport air compressor and combustion air blower are turned off. The burner-desulfurizer 200 is left off until the steam pressure drops below set point P3 (between P2 and P4), where it is turned on, in the reverse sequence from which it was turned off. As long as steam capacity is below 50% of rated capacity, the burner-desulfurizer 200 will continue to cycle on and off as steam pressure fluctuates between P3 and P4. This mode of operation is called the cycling mode. In the cycling mode, the burner-desulfurizer may be left off for periods of up to an hour, before it cools below the temperature at which coal is readily ignited. About three minute's operation is required to heat the bed back to its set point, at a coal feed rate of two-thirds of the full-capacity rate. By this means, the overall turndown of 30-to-1 is achieved. If the steam demand averages less than 1/30 of full capacity for an hour or more, the middle-bed temperature sensor observes that the bed is below the reignition point, and prevents the feeding of coal to the unit until the preheater has been used to return the bed to its minimum ignition temperature. Greater turn-down than 30-to-1 could be achieved, if necessary, by the use of more extensive insulation all around the middle bed.

An alternative mode of operation in the modulating mode causes the combustion air flow to be slaved to the coal feed rate. This increases the system's thermal efficiency by minimizing the excess air, and thereby the thermal stack losses, but requires a more complex control than does the previously described method by which the airflow remains constant throughout.

Periodically, depending on the rate of depletion or accumulation of solids in the system, various parts of the system must be checked for the amount of solids inventory, and appropriate measures must be taken as follows:

The accumulation of coarse particles in the middle bed is not normally observed, unless large particles of mineral matter are fed with the coal. In such a case, the burner is periodically turned down, whereby the downcomer 266 is activated, and all bed material in excess of 6" in the upper bed is blown into the lower bed, and all material in excess of 7" in the lower bed is then removed at overflow 220. The coarse material may be screened out, and the remaining material be returned to the bed, or the entire excess may be dumped into the baghouse hopper for disposal. Use of the storage bed as a removal site permits the excess material to be cooled from the bed temperature (about 1800° F.) to a safe temperature for transporting and storage (under 400° F.) by allowing fluidizing air to enter the burner-desulfurizer at windbox 216 until the lower bed is at the low temperature, at which point a valve (not shown) in over-flow pipe 220 is opened.

After completion of the excess-material removal, the burner resumes its normal operation.

The calcium/sulfur ratio must be made sufficiently large, by proper adjustment of the limestone feed rate, to produce at least enough microchips, (measured in mass per unit time) to absorb all of the $SO_2$ generated by combustion, as explained in detail in the above-mentioned patent application.

Modifications and Variations

Downcomer 266 may be replaced by a vertical standpipe that passes through the middle-bed distributor assembly, and terminates in a trickle valve just above the storage bed's highest bed level. To actuate the downcomer, the trickle valve is opened a predetermined amount, high enough for the middle bed material to flow into the storage bed at a desired speed by gravity, but less than the speed at which the stand-pipe might be starved for bed material, thereby losing its pressure-sealing characteristic. When the downcomer is inactivated, the trickle valve is allowed to return to its closed position. Use of the alternate downcomer mechanism eliminates the need for the screw feeder shown in the preferred downcomer assembly, but requires a more careful adjustment of the trickle valve opening to operate correctly, and is somewhat more subject to malfunction due to the presence of large particulates in the middle bed.

Another variation in operation is to use the combustor-desulfurizer of FIG. 1 as the char burner in U.S. Pat. No. 4,051,791, entitled "Coal Burning Arrangement," granted Oct. 4, 1977, and hereby incorporated herein by reference.

Certain subject matter claimed in this application is also useful in combustors without a separate desulfurization bed, or to burn other than coal.

What is claimed is:

1. A fluidized bed combustor comprising
   burning means including
      apertured means defining a support for fluidization of contents supported thereby,
      housing means for defining with said support a burning zone,
   heat transfer means for carrying fluid therethrough to remove heat produced by burning,
      said heat transfer means being spaced above said support to provide thereunder in said housing means above said support a first storage zone of depth to permit fluidized bed combustion of contents over said support without settledbed contact between the surface of said contents and any said heat transfer means,
   storage means defining a second storage zone to allow storage of materials removed from said first storage zone,
   means for selectively transferring materials from said first storage zone to said second storage zone, and
   means for selectively transferring material from said second storage zone to said first storage zone.

2. The combustor of claim 1 in which said second zone and said first zone are in series, said second zone being upstream of said first zone.

3. The fluidized bed combustor of claim 2 which includes second aperture means defining a support for fluidization of contents supported thereby, said second apertured means defining together with housing means and said apertured means said second storage zone.

4. The combustor of claim 1 which includes fuel introduction means for introducing fuel into said first storage zone, located to introduce said fuel a substantial distance below the top of said first storage zone.

5. The combustor of claim 4 in which said fuel introduction means is means for introducing coal.

6. The combustor of claim 5 in which said fuel introduction means is located from three to six inches below the top of said first storage zone.

7. The combustor of claim 3 in which said second storage zone includes at a predetermined height therein solids outlet means, whereby incombustible solids accumulating in burning zones may be transferred to said second storage zone, air cooled therein, and discharged through said solids outlet means.

8. The combustor of claim 4 which includes a desulfurizing zone including apertured means defining a support for fluidization of sorbent supported thereby and housing means therearound, said desulfurizing zone being in series with and downstream of said burning means.

9. The combustor of claim 3 in which burning zone and said second storage zone are defined by a common housing.

10. The combustor of claim 8 in which said second storage zone, said burning means, and said desulfurizing zone are defined by a common housing.

* * * * *